May 9, 1961  H. B. FREY, JR  2,983,835
TELEVISION SYSTEMS EMBODYING FIBER OPTICAL
DEVICES AND METHOD OF MAKING THE SAME
Filed Sept. 3, 1958  2 Sheets-Sheet 1
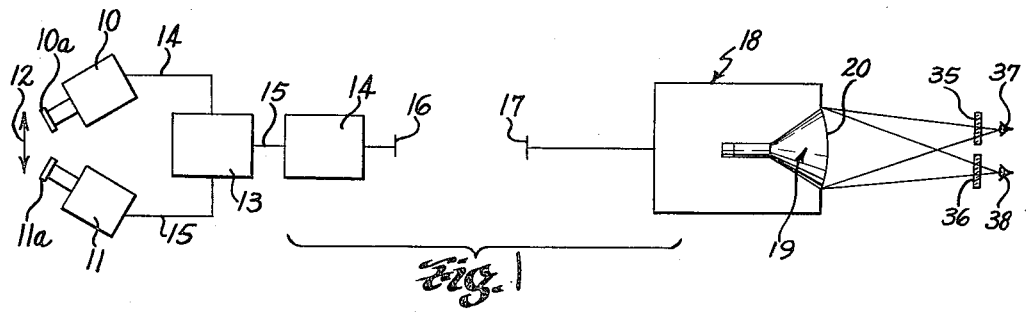
Fig. 1
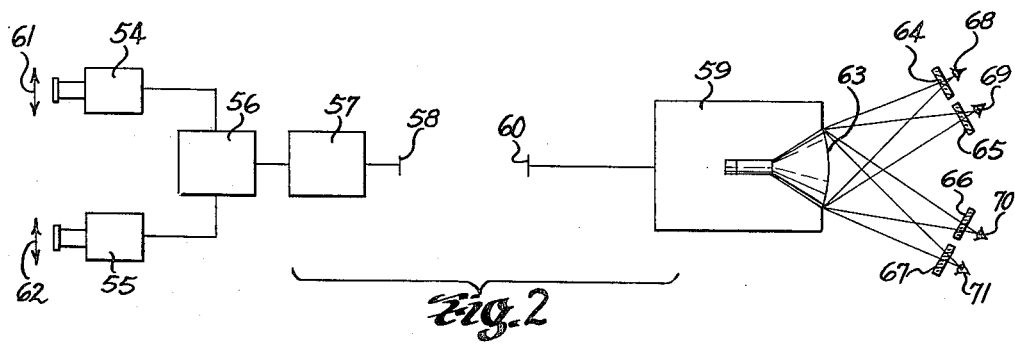
Fig. 2
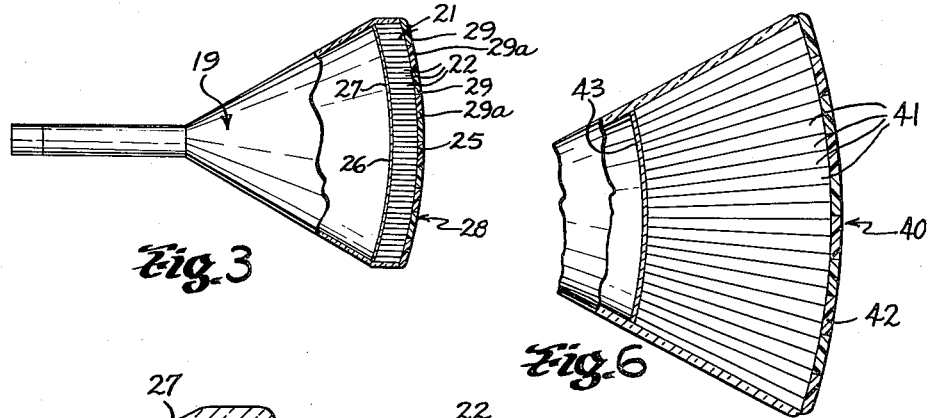
Fig. 3
Fig. 6
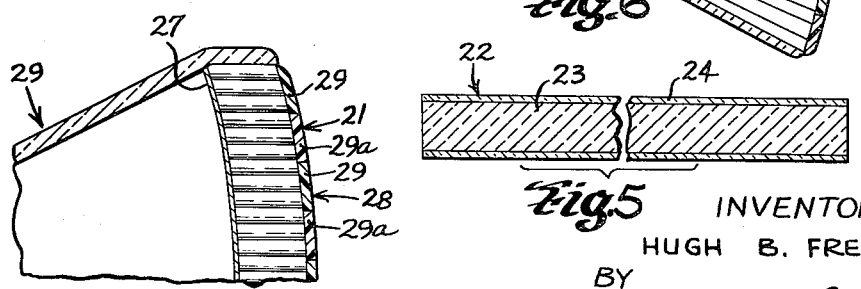
Fig. 4
Fig. 5
INVENTOR
HUGH B. FREY, JR.
BY
Louis L. Gagnon
ATTORNEY May 9, 1961 H. B. FREY, JR 2,983,835
TELEVISION SYSTEMS EMBODYING FIBER OPTICAL
DEVICES AND METHOD OF MAKING THE SAME
Filed Sept. 3, 1958 2 Sheets-Sheet 2

INVENTOR
HUGH B. FREY, JR.
BY
Louis L. Gagnon
ATTORNEY

United States Patent Office 2,983,835
Patented May 9, 1961

2,983,835

TELEVISION SYSTEMS EMBODYING FIBER OPTICAL DEVICES AND METHOD OF MAKING THE SAME

Hugh B. Frey, Jr., Southbridge, Mass., assignor to American Optical Company, Southbridge, Mass., a voluntary association of Massachusetts Filed Sept. 3, 1958, Ser. No. 758,845

8 Claims. (Cl. 313—89)

This invention relates to an improved system for transmitting and receiving separately identifiable images and has particular reference to an improved fiber optical image-forming and transferring device for use in said system and method of making same.

A principal object of this invention is to provide an improved system of the above character embodying novel means and method for simultaneously producing a pair of differently characterized images upon a single cathode ray type electronic tube.

Another object is to provide a novel face plate and method of making the same for a television kinescope or the like for use in a system of the above character wherein the pair of images are differently modified by said face plate when transmitted therethrough.

Another object is to provide a face plate for television kinescopes or the like which embodies a multiplicity of individual light-conducting fibers in connected side-by-side relation with each other wherein the opposite ends of said fibers are optically finished and together provide image-receiving and transmitting faces on said plate and means to cause light transmitted by certain of said fibers to be modified differently than the light received and transmitted by other of said fibers.

Another object is to provide in a television system embodying a kinescope having a face plate of the above character, means for causing one of a pair of images to be conducted only through certain of the fibers of said face plate and to be modified in one manner and further to cause the other of said images to be conducted only through other of said fibers and to be differently modified.

Another object is to provide a kinescope face plate in a television system of the above character wherein said face plate is adapted to render a pair of stereoscopic images separately identifiable when transmitted through said face plate whereby said images may be viewed with suitable analyzing means to render one of said images visible only by one eye of a viewer and the other of said images visible only by the other eye of said viewer wherein the composite of said pair of images, as sensed by the viewer, will appear to have three-dimensional characteristics.

Another object is to provide simple, economical and highly efficient means and method for providing three-dimensional television images.

Another object is to provide in a television system of the above character, novel means and method for producing simultaneously upon a single kinescope of a television receiver a pair of differently characterized images.

A further object is to provide in a television system of the above character, novel means and method for simultaneously producing on a single kinescope of a television receiver, a pair of different images each of which are separately identifiable when viewed through suitable analyzing means placed before the eyes, thereby permitting more than one program to be selectively viewed on said single kinescope simultaneously by different observers.

Other objects and advantages of the invention will become apparent from the following description when taken in conjunction with the accompanying drawings in which:

Fig. 1 is a diagrammatic view in block form of a television system embodying the present invention;

Fig. 2 is a diagrammatic view in block form of a modification of the television system of Fig. 1;

Fig. 3 is a side elevational view of a television kinescope embodying the invention and shown partially in cross-section;

Fig. 4 is a greatly enlarged fragmentary cross-sectional view of a part of the kinescope of Fig. 3;

Fig. 5 is a greatly enlarged longitudinal cross-sectional view of a light-conducting fiber of one type which is used in the fabrication of devices of the invention;

Fig. 6 is a fragmentary side view of a modified form of television kinescope illustrating the invention and shown principally in cross-section;

Figure 7:
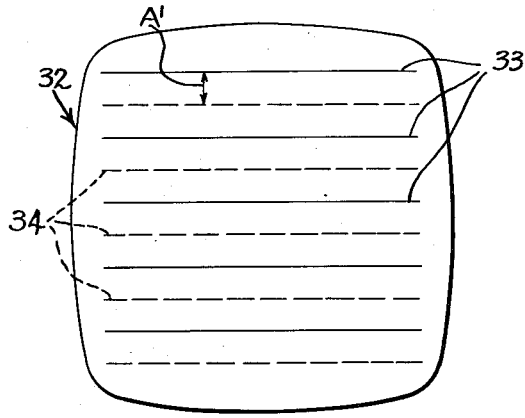
Fig. 7 is a diagrammatic illustration of the picture face of a television kinescope illustrating the horizontal scanning lines which together form a complete picture raster.

Referring more particularly to the drawings wherein like characters of reference designate like parts throughout the various views thereof, a television system is diagrammatically illustrated in Fig. 1 which embodies a pair of conventional television cameras 10 and 11 so disposed relative to each other and to a single object 12 as to simultaneously photograph the object 12 from slightly different angles and each produce video information in the form of an electrical signal wherein each of said signals will be representative of one of a pair of stereo images. The cameras 10 and 11 are entirely conventional in construction and function and are of the type commonly used in present-day television systems. The cameras 10 and 11 may be mounted together as a single stereoscopic camera unit with their objectives 10a and 11a properly spaced and slightly angled relative to each other in a manner conventional to all stereoscopic cameras such as the well-known stereoscopic motion picture or still cameras. In this manner, the cameras 10 and 11 will be readily movable relative to the object 12 as a unit without disturbing the positional relationship of their respective objectives 10a and 11a.

In the television system of Fig. 1 wherein the cameras 10 and 11 convert picture image-forming light into electrical "video" signals rather than causing said light to expose film materials as in the case of conventional stereoscopic cameras, there is provided an electronic mixer 13 for receiving and combining the signals from the cameras 10 and 11. Electrical cables or leads 14 and 15 connect the cameras 10 and 11 with the mixer 13 and the signals are passed from the mixer 13 to a conventional television transmitting unit 14 which is electrically coupled to the mixer 13 by lead 15. The transmitting unit 14 is connected in the usual manner to an antenna 16 from which the picture information signals are radiated into the atmosphere. The picture information signals are then picked up by the usual antenna part 17 of a television receiver 18 having a kinescope 19 associated therewith in the conventional manner to reproduce an image of the object 12 upon the face part 20 of the kinescope 19.

The television system of Fig. 1 differs somewhat from that of the usual arrangement wherein a single camera is used to ultimately produce a single image upon the kinescope face at the receiver. In the system of Fig. 1, the two cameras 10 and 11, in combination with the electronic mixer 13, provide means for telecasting a pair of stereoscopic "video" signals which may be received and reproduced as individual picture images by a conventional receiver such as 18 having a single kinescope therein which is modified in accordance with this invention in a manner which will be discussed in detail hereinafter.

By properly locating the objectives 10a and 11a of the respective cameras 10 and 11 relative to each other in the manner conventional to all stereoscopic cameras, each camera will photograph the object 12 from a slightly different angle and reproduce the characteristics of the object 12 in the form of an individual electronic or "video" signal whereupon the two signals will be alternately and successively continuously passed on to the transmitter 14 by the mixer 13 at a predetermined rate in accordance with the scanning rate of the television system. The mixer 13 embodies a conventional electronic switching or gating mechanism such as, for example, a multivibrator which is tuned to the frequency of the scanning rate of the television cameras to cause the picture information from the cameras to be alternately and successively passed to the transmitter 14. Since, in conventional United States television systems a complete picture "frame" produced by a camera consists of 525 horizontal scanning lines which are divided into two "fields," the first "field" comprising the odd-numbered scanning lines and the second "field" comprising the even-numbered scanning lines (which is often referred to as the "interlace"), it has been found convenient to transmit the picture information from one camera for a time cycle long enough for the transmitter 14 to receive only the first "field" of each picture "frame" and to immediately thereafter block or gate the picture information from said camera so as to allow the transmitter 14 to receive only the picture information from the second camera during the time cycle of the second "field" of each picture frame and so on. Thus, it can be seen that the combined picture information from the two cameras which is received by the transmitter 14 will be a composite of the two pictures of the object 12 which are taken by the pair of cameras 10 and 11. Since in conventional television systems, both the "field" and "frame" repetition rates are fixed and constant in a well-known manner, it is a simple matter to tune the multivibrator of the mixer 13 to gate the signals from the cameras 10 and 11 so as to cause the picture information sent out by the transmitter 14 to be picked up by the receiver 18 which has its scanning rate synchronized with that of the cameras and produce upon the raster of the kinescope 19 a pair of stereoscopic images for each complete frame of the picture image which is formed on the kinescope face 20.

Since the "field" and "frame" repetition rate of the scanning system of the receiver is synchronized with that of the cameras in the well-known manner, each individual "frame" of the picture formed on the face 20 of the kinescope 19 will embody in its first "field," the picture information produced by one of the cameras (for example, camera 10) and in its second "field" or the "interlace" of the particular "frame," it will embody the picture information produced by the other of the cameras (for example, camera 11).

The present invention provides means and method for producing stereoscopic images in conventional television systems and it is pointed out that the technique of synchronizing the picture "field" and "frame" repetition rates of television cameras and receivers and the forming of picture elements or "frames" consisting of two "fields" is conventional practice known in the art and needs no further description herein. It is further pointed out that the number of scanning lines used to form a particular picture "field" and the repetition rate thereof is immaterial to this invention, it being only important that the gating mechanism of the mixer 13 is tuned to whatever "field" repetition rate is used to form the complete picture "frame." For example, in conventional United States television systems, the repetition rate of the "fields" is 60 per second and the "frame" frequency is 30 cycles per second thereby presenting 60 views of a picture to the eye during one second. In such a case the gating mechanism of the mixer 13 is controlled to alternately and successively pass picture information from each of the cameras at intervals of 1/60 of a second and each "frame" which is repeated every 1/30 of a second will thereby embody a composite of the two images produced by the pair of cameras 10 and 11.

Having provided a pair of stereoscopic images upon the face 20 of the television kinescope 19 in the manner discussed above, means must be provided for permitting said images to be separated by the eyes of an observer so as to cause one eye to see only one of the images and the other eye to see only the other of said images thereby presenting to the observer a composite picture appearing to be three-dimensional in character.

To accomplish this separation of the stereoscopic images by the eyes of an observer, the present invention provides a novel face plate 21 for the kinescope 19 (see Figs. 3 and 4) which replaces the conventional face pieces of the type formed from a single piece of glass having a phosphor coating on its inner side surface. Other than the face plate 21, the kinescope 19 is entirely conventional in construction and shape and the face plate 21 is formed to an outer contour shape in accordance with that of the adjacent end of the particular kinescope to which it is to be applied.

The face plate 21 embodies a great number of individual light-conducting fibers 22 which are secured together in side-by-side parallel relation with each other. The fibers 22 of the kinescope face plate 21 of Figs. 3 and 4 are substantially of uniform cross-sectional area throughout their length (see Fig. 5) and are each formed of a core part 23 of a relatively high index light-conducting material such, as for example, a flint glass and an outer relatively thin coating or cladding 24 of a low index material such as, for example, crown glass. The cores 23 of the fibers 22 function to provide a path for light to travel through the fibers and the claddings 24 function to light insulate fibers 22 from each other in the manner common to transilluminators of this type while further providing means for connecting the fibers together.

Fibers such as 22 (Fig. 5) may be formed of various combinations of high and low index light-conducting glasses or materials and are usually fabricated by initially providing a rod of high index glass having a coating or envelope of low index glass thereon and heat-drawing the composite structure down to a desired filament or fiber size. The fiber sizes are selected in accordance with the degree of resolution desired of the image which is to be transferred through the face plate. Within practical limits, smaller fibers in greater numbers provide higher degrees of image resolution and it has been found that by fabricating face plates of the above character of fibers which are approximately .002" in diameter or of an equivalent cross-sectional area, very satisfactory results will be obtained.

The face plate 21 may be fabricated to a desired size and contour shape by various different techniques and reference is made to patent application Serial No. 715,406 filed February 14, 1958, by Wilfred P. Bazinet, Jr., or patent application Serial No. 669,833 filed July 3, 1957, by Frederick H. Norton, for examples of methods by which the fibers 22 may be assembled to form the composite fiber-optical structure of the face plate 21.

When the fibers 22 have been assembled in the above manner, the opposite faces 25 and 26 of the structure are optically finished by grinding and polishing to render the ends of the fibers 22 readily adaptable to receive and transmit light. The face 26 is preferably formed to a spherical curvature of a radius substantially conforming to the radius of curvature which has been provided on the inner surfaces of conventional solid glass face plates which radius is controlled in accordance with the distance between the inner face and the electron beam deflection means of kinescopes for reasons which are well-known in television kinescope construction. A coating of phosphor 27 is provided in optical contact with the face 26 to be excited by the electron beam of the kinescope and produce image-forming light in the conventional manner.

Image-forming light which is produced by the electron beam on the phosphor 27 is conducted through the fibers 22 and emitted at the face 25. With the fiber optical face plate 21, picture images which are transferred from the face 26 to the face 25 thereof may be viewed from any convenient location forwardly of the kinescope 19 without the effects of parallax or halation which is common to kinescopes having conventional solid glass face plates when viewed from angles other than head on. That is, with the face plate 21, an image formed by the phosphor 27 is conducted through the fibers 22 and reproduced upon its front face 25 for direct viewing whereas in conventional face plates, the image produced by the phosphor must be viewed through the material of the face plate.

Figure 8:
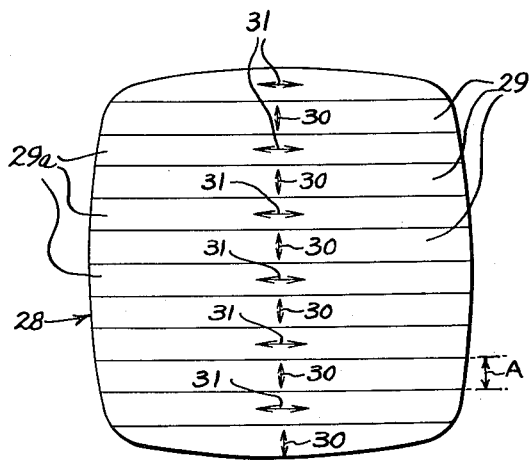
Fig. 8 is a face or plan view of light-modifying means for use with one form of television kinescope face plate of the character embodying this invention.

In order to provide means for differently characterizing the light which produces each of the above-discussed stereoscopic images so as to cause said images, when simultaneously viewed with proper analyzing means, to appear as a composite three-dimensional image, one form of the invention provides, in optical contact with the face 25 of the face plate 21, a light-polarizing grid 28 (see Figs. 3, 4 and 8). The grid 28 comprises a plurality of horizontally disposed light-polarizing strips 29 and 29a of substantially equal widths in edge-to-edge connected relation with each other.

The strips 29 and 29a may be formed of any known sheet-like transparent polarizing material such as polyvinyl alcohol which has been stretched or otherwise treated to orient its molecular structure and thereafter treated to render the material light-polarizing by known methods. The strips 29 and 29a are cemented or otherwise directly attached to the face 25 of the kinescope 19. One method of fabricating the grid 28 is to connect the strips together in edge-to-edge relation with each other with a cement or the like and thus form a composite sheet-like structure which may thereafter be attached to the face 25 of the kinescope. The strips 29 of the grid 28 may be formed with their axes of polarization 30 disposed normal to the direction of their length and the strips 29a may be formed with their axes of polarization 31 disposed parallel to the direction of their length or normal to the axes of polarization of the strips 29. It is pointed out that alternatively the axes of polarization of the strips 29 and 29a could be reversed, if desired, it being immaterial which strips are selected to have their axes normal to the direction of their length. Further, the axes of polarization of strips 29 could be disposed at a 45° angle relative to their length and the axes of polarization of strips 29a disposed in 90° relation with the axes of strips 29. However, the axes of polarization of the strips 29 must be in normal relation to the axes of polarization of the strips 29a. The light-polarizing grid 28 may alternatively be formed by vectographic processes in a manner which would be obvious to one familiar with vectographic techniques known in the art.

As stated hereinabove, the pair of stereoscopic images are formed on each "frame" of the picture raster of the kinescope 19 and one image is formed by the first "field" of a picture "frame" which embodies the odd-numbered scanning lines and the second image is formed by the second "field" which embodies the even-numbered scanning lines hereinafter referred to as the "interlace."

Referring to Fig. 7 wherein a picture raster is diagrammatically shown, for purposes of illustration, to embody 10 scanning lines rather than the usual 525, the first stereoscopic image is produced by the scanning lines 33 (solid lines) and the second stereoscopic image is formed by the scanning lines 34 (dotted lines) known as the "interlace." Therefore, in order to differently characterize the light forming each of the two images, the strips 29 and 29a of the grid 28 are each of a width A which is substantially equal to the spacing A' between any two adjacent scanning lines 33 and 34. The spacing A' is substantially constant between all scanning lines of conventional television picture rasters but varies in size in accordance with the size of the picture screen or face 25 of the particular kinescope due to the fixed number of scanning lines inherent to the television system (525 in the United States). For example, the spacing A' for a television kinescope of the type used for conventional U.S. television systems would be approximately .032 inch for a picture raster of approximately 17" in height and for a picture raster which is approximately 21" in height, the spacing A' would be approximately .040 inch. The spacing A' may be readily determined by measuring the overall height of a picture raster and dividing the same by the number of scanning lines which make up the picture raster.

With the widths of the strips 29 and 29a properly controlled in size in accordance with the particular kinescope with which the grid 28 is to be used, the grid 28 is secured to the face 25 of the kinescope as shown in Figs. 3 and 4, with the central longitudinal axes of its strips 29 and 29a in superimposed relation with the respective locations on the face 25 at which the image-forming light from the scanning lines 33 and 34 will appear. In this manner, it can be seen that the image-forming light along the scanning lines 33 will be directed through only the strips 29 of the grid 28 so as to be polarized in one direction (in the case illustrated, vertically) and the image-forming light along the scanning lines 34 will be directed through only strips 29a so as to be polarized in another direction (horizontally, as illustrated). Therefore, one of the stereoscopic images emitted from the kinescope picture face will consist of light which is polarized in one direction and the other stereoscopic image will consist of light which is polarized in a direction normal to the light of said first image.

In order to view the two images simultaneously and to obtain stereopsis, a pair of analyzers 35 and 36 (see Fig. 1) are worn in spectacle form or otherwise supported before the eyes 37 and 38 of a viewer. The analyzers 35 and 36 are simply a pair of conventional light-polarizing lens elements such as, for example, the well-known analyzers which are supplied at motion picture theaters for viewing 3D motion pictures. The analyzers 35 and 36 each have their axes of polarization oriented in normal relation with the other, one element having its axis of polarization substantially vertical when in use and the other element having its axis of polarization substantially horizontal thereby permitting one eye of a viewer to see only one of the pair of images on the kinescope 19, and the other eye to see only the other of said images. While the axes of polarization of the strips 29 and 29a have been illustrated as being disposed vertically and horizontally, it should be understood that other angles of polarization may be used since it is only important that the axes of polarization of the strips 29 are in substantially normal relation to the axes of polarization of the strips 29a. Furthermore, it is pointed out that ideally, the axes of polarization of the analyzers 35 and 36 should be positioned in parallel relation to their respective axes of the strips 29 and 29a. However, by mounting the analyzers in spectacle frames so that their axes of polarization are substantially parallel to the axes of polarization of the strips when the viewer's head is comfortably positioned for viewing, considerable head movement may take place without disturbing the desired three-dimensional viewing effect produced by the composite of the stereoscopic images on the kinescope face.

It should be obvious that it is immaterial in a system such as shown in Fig. 1 which of the cameras are selected to produce the first or second "fields" of the picture "frames" and likewise, it is immaterial or at least a matter of choice as to which eye of a viewer is selected to view either the first or second "fields" of each picture "frame" produced on the raster of the kinescope 19. The selection as to which eye is to view a particular field is made in accordance with the axis of polarization of the particular analyzing element 35 or 36 placed therebefore and the selection as to which camera is to produce a particular picture "field" is determined by tuning the mixer 13 to block out the unwanted "field" for the particular camera selected.

With the system of Fig. 1, three-dimensional telecasting may be simply, efficiently and effectively accomplished and any desired number of viewers each having analyzers such as 35 and 36 before their eyes may simultaneously view the kinescope raster from any desired convenient viewing position relative thereto and receive a true, substantially undistorted and clear three-dimensionally appearing picture image without encountering the adverse effects of parallax when viewed from angles other than head-on.

In Fig. 6 there is illustrated a modified face plate 40 for a television kinescope wherein outwardly tapering light-conducting fibers 41 which are secured in side-by-side relation with each other are used, otherwise the face plate 40 is identical to the face plate 21 just described. Such a face plate will provide at its face 42 an enlarged reproduction of the picture image which is formed at its inner face 43 in the manner disclosed in detail in a patent application bearing Serial No. 736,172, filed May 19, 1958, by John W. Hicks, Jr., and in patent application Serial No. 727,904 filed April 11, 1958, by John W. Hicks, Jr. et al.

Figure 9:
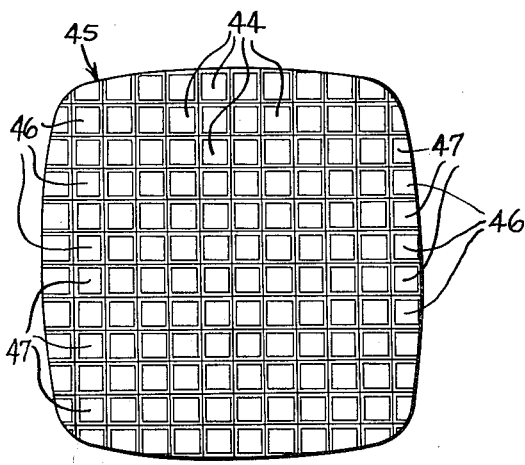
Fig. 9 is a diagrammatic face or elevational view of a modified form of television kinescope face plate of the invention.

A further modification of the kinescope face piece of the invention is shown diagrammatically in Fig. 9 which is a face view of the ends of the light-conducting fibers 44 making up such a plate 45. The fibers 44 which have been shown square in cross-sectional shape for purposes of illustration are assembled in connected side-by-side relation with each other generally in the same manner as the fibers 22 of face plate 21. However, in the present instance, the fibers 44 are carefully placed in horizontal rows, one above the other, as illustrated and the cross section of each of the fibers 44 is controlled in size so as to be of a height substantially equal the spacing A' between the scanning lines of the particular kinescope with which the face plate 45 is to be used. In this manner, when properly placed on the kinescope, the horizontally disposed rows of fibers 44 will lie in a position such as to each receive light from only one of the scanning lines 33 or 34. It is pointed out that the picture raster of a kinescope may be adjusted in a well-known manner to raise or lower its location on the image-forming face of the kinescope. Therefore, following the assembly of the face plate 45 with a kinescope, the electron beam deflection means of the kinescope may be adjusted to locate the raster in a position on the face plate 45 wherein the scanning lines will be properly aligned with the horizontal rows of fibers 44. In order to cause the face plate 44 to differently modify the image-forming light produced by the odd-numbered scanning lines from the image-forming light produced by the even-numbered scanning lines, the fibers 44 which make up the odd-numbered rows 46 are formed with light-conducting core parts of a high index glass which will transmit only light of a particular color such as, for example, green and the fibers which make up the even-numbered rows 47 are formed with light-conducting core parts which will transmit only light of another color such as, for example, red.

In this manner, no light-polarizing grid such as 28 is required over the outer face of the plate 45 and the two stereoscopic picture images each being formed of differently colored substantially monochromatic light may be readily separately distinguishable by the eyes of a viewer by replacing the polarizing elements 35 and 36 of Fig. 1 with color filters, one of which will pass only green light and the other of which will pass only red light. In this manner, the composite of the red and green images will provide the viewer with a picture image appearing to be three-dimensional in character.

Fibers adapted to transmit substantially only green light may be constructed with core parts of a dense flint colored with approximately 1½% chromic oxide and claddings of crown glass or the like similarly colored. Fibers adapted to transmit substantially only red light may be constructed with core parts of a dense flint colored with approximately ½% gold chloride and claddings of crown glass or the like similarly colored.

Figure 10:
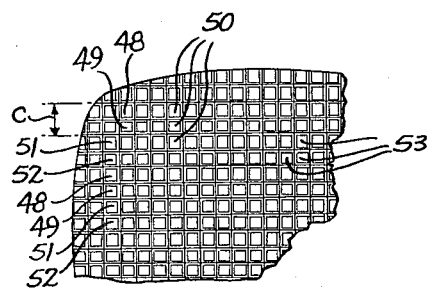
Fig. 10 is a fragmentary elevational view diagrammatically illustrating a modified form of the face plate illustrated in Fig. 9.

It should be understood that each of the horizontal rows 46 and 47 of single fiber thicknesses as shown in Fig. 9 may alternatively each be replaced by two or more rows of smaller fibers of identical color characteristics in the manner shown in Fig. 10. In Fig. 10, the two horizontal rows 48 and 49 embody fibers 50 capable of transmitting light of only one particular color and the two rows 51 and 52 embody fibers 53 capable of transmitting light only of a different selected color. Furthermore, the overall width C of each of the color bands thus formed across the face plate is controlled to be equal to the above-mentioned spacing A' between the scanning lines 33 and 34 of the raster which is produced by the particular kinescope with which the face plate of Fig. 10 is to be used.

While thus far the description has been directed specifically to the forming of three-dimensional television pictures, it should be readily apparent that the pair of images which are produced by cameras 10 and 11 need not be of the same object 12. That is, the television system of Fig. 1 without modification may be used to simultaneously program two different images and reproduce the same on the single kinescope of the receiver.

In Fig. 2 there is shown an arrangement embodying a pair of conventional television cameras 54 and 55, a mixer 56 which is identical to mixer 13, a conventional television transmitter 57 having an antenna 58 and a receiver 59 having an antenna 60 which is identical to receiver 18 and antenna 17. By separating the cameras 54 and 55 from each other and directing them toward separate objects 61 and 62, respectively, a composite image of the two objects 61 and 62 will be produced upon the kinescope face 63 of the receiver 59. The system of Fig. 2 will function in a manner identical to that of Fig. 1 and needs no further description herein.

With a system such as shown in Fig. 2, two individual video programs may be simultaneously viewed by different people with the use of suitable analyzers before the eyes of said people.

When using a kinescope face plate of the type shown in Figs. 3 and 4 which embodies the polarizing grid 28, the two images may be viewed separately by the two viewers with the use of polarized analyzers 64 and 65 and analyzers 66 and 67. In this instance, the analyzers 64 and 65 are positioned before the eyes 68 and 69 of one of the viewers and are each arranged with their axes of polarization parallel to each other and, for example, disposed vertically relative to the kinescope face 63. Thus, only the image-forming light which passes through the strips 29 of the grid 28 will be received by the eyes 68 and 69. The other viewer's eyes 70 and 71, will then have analyzers 66 and 67 positioned before them with their axes of polarization parallel to each other and disposed horizontally or substantially normal to the axes of polarization of the analyzers 64 and 65. In this case, only the image-forming light passing through the strips 29a of the grid 28 will be received by the eyes 70 and 71 of the second viewer. Thus, it can be seen that the two people viewing the kinescope face 63 will each simultaneously see a different image, one being the image of the object 61 and the other being the image of the object 62. It should also be understood that any number of people may view the kinescope face 63 simultaneously and by selecting a particular pair of analyzers such as 64 and 65 or 66 and 67 they may choose from the two images, the particular image or program which they wish to view without interference from the other of said images or programs. If, for example, the kinescope face plate 45 of Fig. 9 is provided at the kinescope face 63, the analyzers 64 and 65 for one of the viewers would both be such as to transmit light of only one of the colors of the image-forming light emitted by the face plate 45 and the analyzers 66 and 67 for another viewer would both be such as to transmit light of only the other of the colors of the image-forming light emitted by the face plate 45. In this manner, one of the viewers would see only the image of one of the objects 61 or 62 and the other viewer would see only the image of the other of said objects.

It is pointed out that this invention is not strictly limited to television systems but is readily adaptable to any system wherein picture-like information is produced upon a cathode-ray type of tube. Furthermore, the horizontal-line type of scanning system described above was given for purposes of illustrating the invention, it being apparent that circular or other types of scanning arrangements may be modified to simultaneously reproduce two or more differently characterized images. By alternately and successively transmitting differently characterized picture information at controlled successive intervals, different forms of pictures may be simultaneously received by conventional cathode-ray tubes of various types and reproduced in pre-arranged patterns on the viewing faces of said tubes where, in accordance with this invention, the reproductions of said picture information may be viewed in such a manner as to render said different forms of picture information separately visible or, if desired, visible as a composite image.

From the foregoing, it will be seen that simple, efficient and economical means and method have been provided for accomplishing all of the objects and advantages of the invention. Nevertheless, it is apparent that many changes in the details of construction, arrangement of parts or steps in the method may be made without departing from the spirit of the invention as expressed in the accompanying claims and the invention is not to be limited to the exact matters shown and described as only the preferred matters have been given by way of illustration.

Having described my invention, I claim:

1. A face plate on a cathode ray tube comprising an assembly of a plurality of individually light-insulated light-conducting fibers connected together in side-by-side relation with each other and each embodying a core part of material having a relatively high index of refraction with an outer surrounding coating of material having a relatively low index of refraction, one side of said assembly being disposed outwardly of said tube and finished to render the respective adjacent ends of said fibers transmissive to light received thereby from within said fibers, fluorescent means in contact with the opposite ends of said fibers for producing and causing light to be directed into the fibers when said tube is in operation and means for causing light emitted from preselected groups of said fibers to be differently characterized and separately identifiable from light directed into and emitted from other adjacent groups of said fibers.

2. A face plate for a cathode ray tube comprising an assembly of a plurality of individually light-insulated light-conducting fibers in connected side-by-side relation with each other and each embodying a core part of material having a relatively high index of refraction with a relatively thin outer coating of material having a relatively low index of refraction, one side of said assembly being intended for use as the outer face of said tube and having a finish thereon such as to render the adjacent ends of said fibers transmissive to light directed therethrough from within the fibers, fluorescent means in contact with the opposite ends of said fibers for producing and directing light into the fibers when said face plate is in use and means on said finished side of said assembly of fibers for receiving light therefrom and for rendering certain portions of light emitted from said fibers separately and clearly identifiable from other portions thereof.

3. A face plate for a kinescope of the type having means therein for causing electrons to scan across said face plate when the same is in a position of use on said kinescope and produce a multiplicity of substantially equally spaced parallel scanning lines, said face plate comprising an assembly of a plurality of light-conducting fibers in connected side-by-side relation with each other, one side of said assembly being optically finished to render the respective ends of the fibers thereof more transmissive to light, a coating of fluorescent material in contact with the other side of said assembly, said material being adapted to produce light energy when excited by electrons caused to scan the same whereupon said light will enter said fibers along said scanning lines, gridlike means adapted to receive light from said optically finished side of said assembly, said gridlike means embodying alternate strips of differently polarized light-conducting material disposed with their longitudinal axes in substantially superimposed relation with said scanning lines whereby light emitted from said fibers will pass through said strips and be differently polarized thereby to render the light initially produced by some of said scanning lines differently identifiable from the light initially produced by others of said scanning lines when viewed through said gridlike means.

4. A face plate for a kinescope of the type having means therein for causing electrons to scan across said face plate when in a position of use on said kinescope and produce a multiplicity of parallel substantially equally spaced image-forming scanning lines, said face plate comprising an assembly of a plurality of light-conducting fibers in connected side-by-side relation with each other, the ends of said fibers at one side of said assembly being provided with a coating of fluorescent material adapted to fluoresce when scanned by said electrons and cause the light therefrom to enter and pass through said fibers, the ends of said fibers at the opposite side of said assembly being optically finished to permit said light to exit freely therefrom, and light-polarizing means on said opposite side of said assembly adapted to differently polarize said light along some of said scanning lines than along others thereof and render certain of the scanning lines when viewed through said light-polarizing means differently identifiable from others thereof.

5. A face plate for a kinescope of the type having means therein for causing electrons to scan across said face plate when the same is in a position of use on said kinescope and produce a multiplicity of substantially equally spaced parallel scanning lines, said face plate comprising an assembly of a plurality of light-conducting fibers in connected side-by-side relation with each other, at least one side of said assembly being optically finished to render the respective ends of the fibers thereof more transmissive to light, a coating of fluorescent material in contact with another side of said assembly, said material being adapted to produce light energy when excited by electrons caused to scan the same whereupon said light will enter said fibers along said scanning lines, gridlike means in optical contact with said optically finished side of said assembly having alternate strips of differently characterized light-conducting material in edge-toedge relation with each other and disposed parallel to said scanning lines, said strips each being of a width substantially equal to the distance between any two adjacent scanning lines and further being disposed with their longitudinal axes in substantially superimposed relation with said scanning lines whereby light emitted from said fibers will pass through said strips of said gridlike means and be differently modified thereby to render the light initially produced by some of said scanning lines differently identifiable from the light initially produced by others of said scanning lines.

6. A face plate for a cathode ray tube comprising an assembly of a plurality of light-conducting fibers in side-by-side substantially parallel connected relation with each other, at least one side of said assembly being optically finished to render the respective ends of said fibers highly transmissive to light, fluorescent means in contact with the opposite side of said assembly for producing light when electronically excited and for causing said light to be directed into the fibers, certain of said fibers being constructed of light-conducting material adapted to transmit substantially only monochromatic light of one color and others of said fibers being constructed of light-conducting material adapted to transmit substantially only monochromatic light of a different color whereby selected portions of the light produced by said luminous means will be transferred through some of the fibers of said face plate and other portions of said light will be transferred through others of said fibers.

7. A face plate for a kinescope of the type having means therein for causing electrons to scan across said face plate when in a position of use on said kinescope and produce a multiplicity of parallel substantially equally spaced image-forming scanning lines, said face plate comprising an assembly of a plurality of light-conducting fibers in connected side-by-side relation with each other, the ends of said fibers at one side of said assembly being provided with a coating of fluorescent material adapted to fluoresce when scanned by said electrons and cause the light therefrom to enter and pass through said fibers along said scanning lines, the ends of said fibers at the opposite side of said assembly being optically fiinished to permit said light to exit freely therefrom, the fibers of said face plate at the location of certain of said scanning lines being constructed of light-conducting material adapted to transmit only substantially monochromatic light of one color and the fibers at the location of others of said scanning lines being constructed of light-conducting material adapted to transmit only substantially monochromatic light of a different color whereby when viewed at their optically finished ends as a whole, light transferred through said face plate will be differently characterized along certain of said scanning lines and separately identifiable from light along others of said scanning lines.

8. A cathode ray tube having a face plate comprised of an assembly of individually light-insulated light-conducting fibers each embodying a core part of light-conducting material having a relatively high index of refraction with a comparatively thin surrounding cladding of material having a relatively low index of refraction, said fibers being connected together in side-by-side relation with each other, the ends of said fibers adjacent one side of said assembly being finished in the form of a substantially continuous light-transmitting face part of said assembly disposed outwardly of said tube, the opposite ends of said fibers being similarly finished in the form of a substantially continuous light-receiving face part disposed inwardly of said tube, fluorescent means in contact with said light-receiving face part for producing and causing light to be directed into said fibers when said tube is in operation and means for rendering light emitted from certain of said fibers to be differently characterized and separately identifiable from light emitted from others of said fibers.

References Cited in the file of this patent

UNITED STATES PATENTS

| | | |
|---|---|---|
| 1,751,584 | Hansell | Mar. 25, 1930 |
| 1,848,814 | Allen | Mar. 8, 1932 |
| 2,091,152 | Malpica | Aug. 24, 1937 |
| 2,122,750 | Nicolson | July 5, 1938 |
| 2,301,254 | Carnahan | Nov. 10, 1942 |
| 2,307,188 | Bedford | Jan. 5, 1943 |
| 2,354,591 | Goldsmith | July 25, 1944 |
| 2,495,697 | Chilowsky | Jan. 31, 1950 |
| 2,510,106 | Henroteau | June 6, 1950 |
| 2,660,684 | Parker | Nov. 24, 1953 |
| 2,728,013 | Tourshou | Dec. 20, 1955 |
| 2,757,302 | Hughes | July 31, 1956 |